(12) United States Patent
Meeks et al.

(10) Patent No.: US 10,577,058 B2
(45) Date of Patent: Mar. 3, 2020

(54) BOTTOM PLATE FOR MARINE BOOM

(71) Applicant: Worthington Products Incorporated, Canton, OH (US)

(72) Inventors: Paul S. Meeks, Massillon, OH (US); Jon D. Garver, Canton, OH (US); Jeffrey S. Sanger, Jensen Beach, FL (US)

(73) Assignee: WORTHINGTON PRODUCTS, INC., Canton, OH (US)

( * ) Notice: Subject to any disclaimer, the term of this patent is extended or adjusted under 35 U.S.C. 154(b) by 0 days.

(21) Appl. No.: 16/002,049

(22) Filed: Jun. 7, 2018

(65) Prior Publication Data
US 2019/0375483 A1 Dec. 12, 2019

(51) Int. Cl.
*B63B 35/62* (2006.01)
*B63B 35/44* (2006.01)
*E02B 15/04* (2006.01)

(52) U.S. Cl.
CPC .............. *B63B 35/62* (2013.01); *B63B 35/44* (2013.01); *E02B 15/04* (2013.01)

(58) Field of Classification Search
CPC ... B63B 35/44; E02B 3/04; E02B 3/20; E02B 3/00; E02B 15/00; E02B 15/04; B63G 9/04
USPC ................ 114/266, 267; 405/66, 70, 71, 72; 441/48, 49, 54
See application file for complete search history.

(56) References Cited

U.S. PATENT DOCUMENTS

| | | | | | |
|---|---|---|---|---|---|
| 3,783,622 | A | * | 1/1974 | Gambel | E02B 15/08 405/71 |
| 4,016,726 | A | * | 4/1977 | Campbell | E02B 15/08 405/71 |
| 4,174,186 | A | * | 11/1979 | Kasai | E02B 15/08 405/71 |
| 4,295,756 | A | * | 10/1981 | Blair | E02B 15/08 405/72 |
| 4,507,017 | A | * | 3/1985 | Magoon | E02B 15/08 405/72 |
| 5,054,960 | A | * | 10/1991 | Manzano | E02B 15/08 405/72 |
| 5,509,756 | A | * | 4/1996 | Chou | E02B 15/08 405/72 |
| 5,713,698 | A | * | 2/1998 | Worsley | E02B 15/08 405/72 |

* cited by examiner

*Primary Examiner* — Lars A Olson
(74) *Attorney, Agent, or Firm* — Black, McCuskey, Souers & Arbaugh, LPA

(57) ABSTRACT

A bottom plate for a marine boom includes a main plate extending in a first plane. The main plate has first and second ends with first and second sides extending there between. The first plane is defined by a longitudinal axis extending between the first and second ends and a lateral axis normal to the longitudinal axis and extending between the first and second sides. Top and bottom surfaces are bounded by the first and second ends and the first and second sides and extend parallel to the first plane. At least one lug is attached to the main plate and extends in a second plane generally perpendicular to the first plane. The lug includes a flange defining an aperture aligned generally parallel with the lateral axis, where radial thickness of the flange increases toward the main plate and decreases away from the main plate.

17 Claims, 9 Drawing Sheets

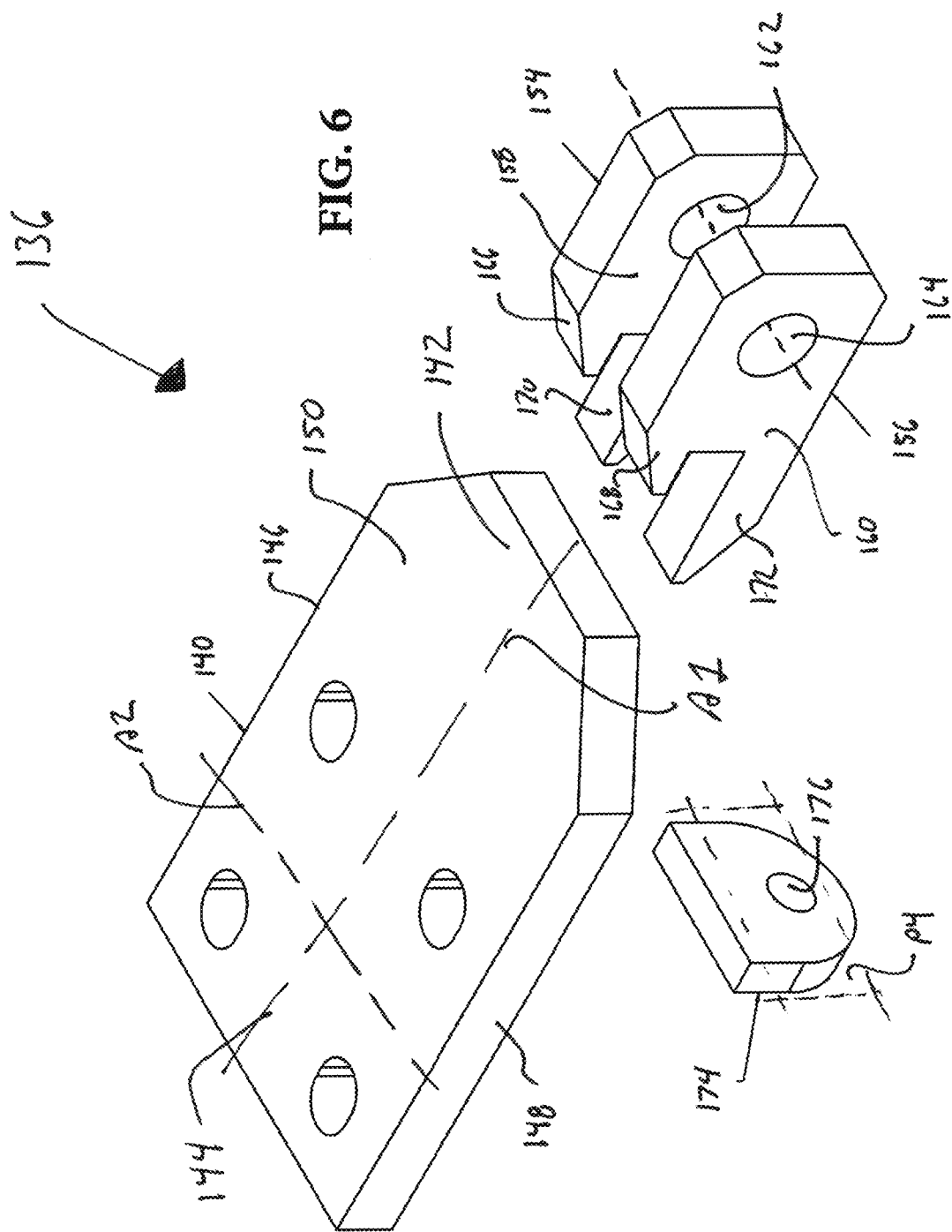

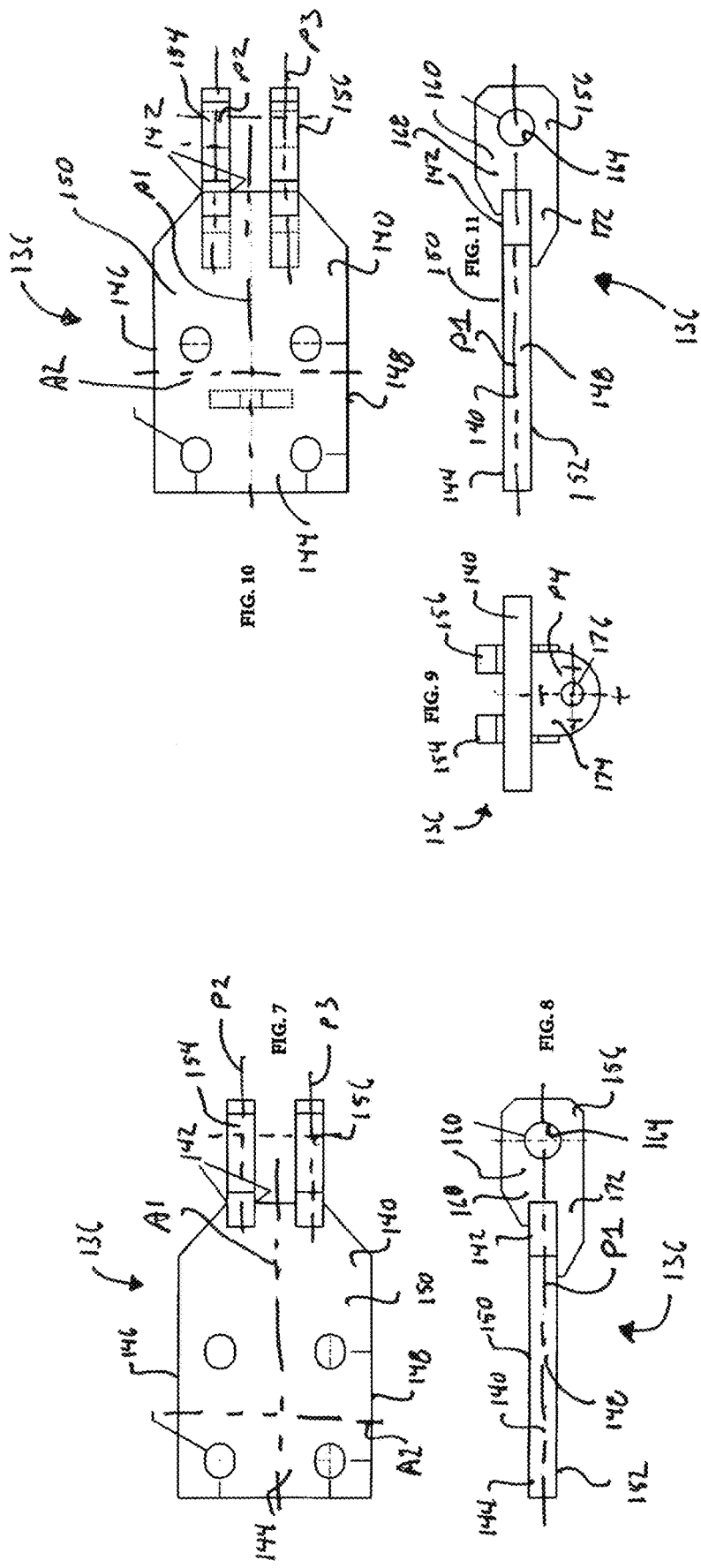

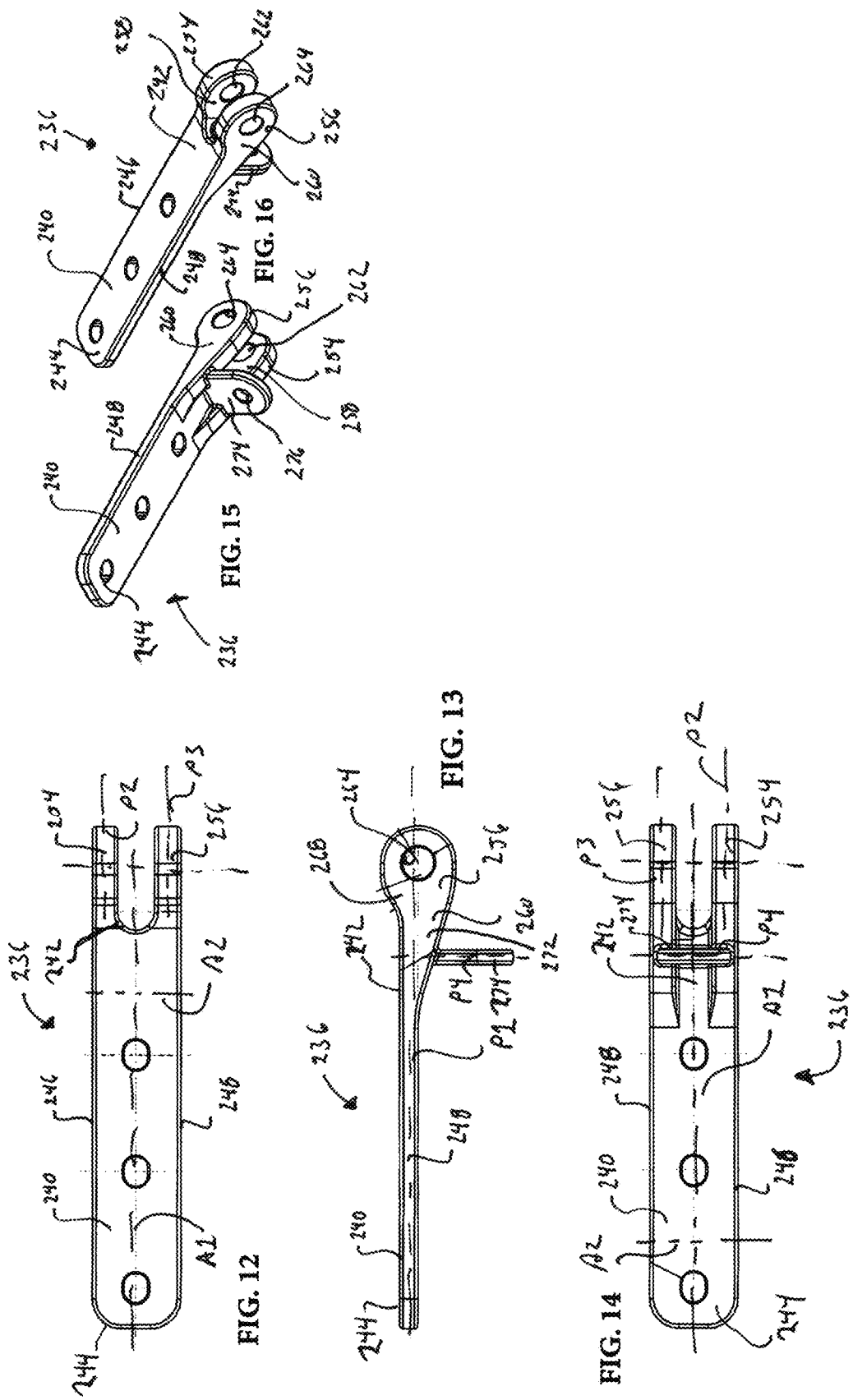

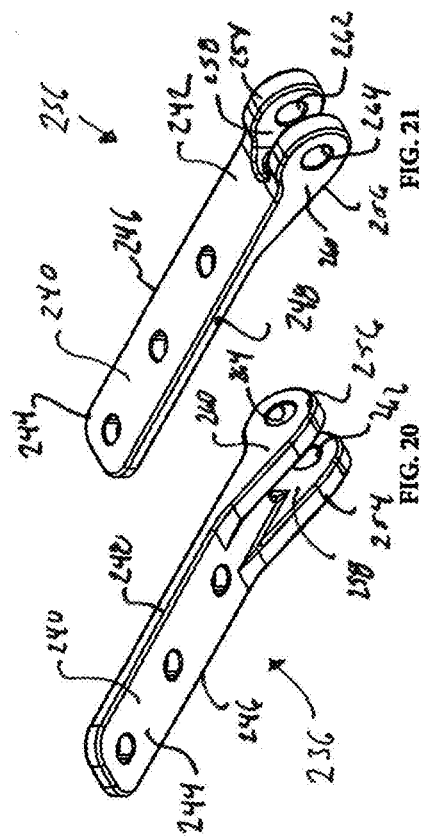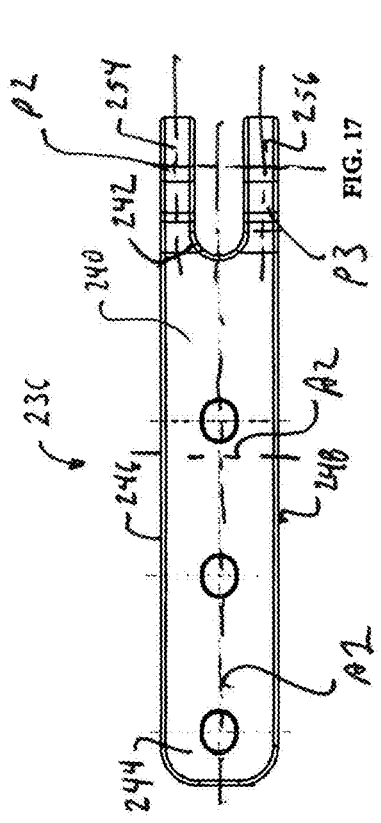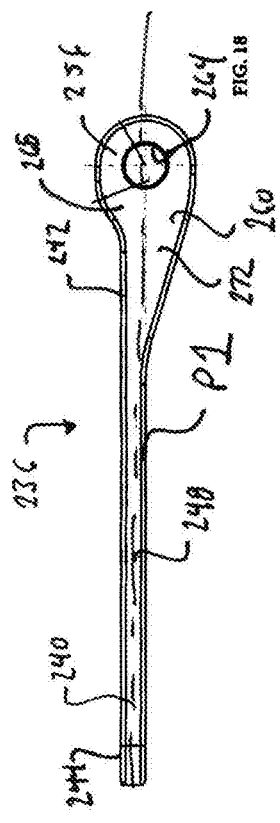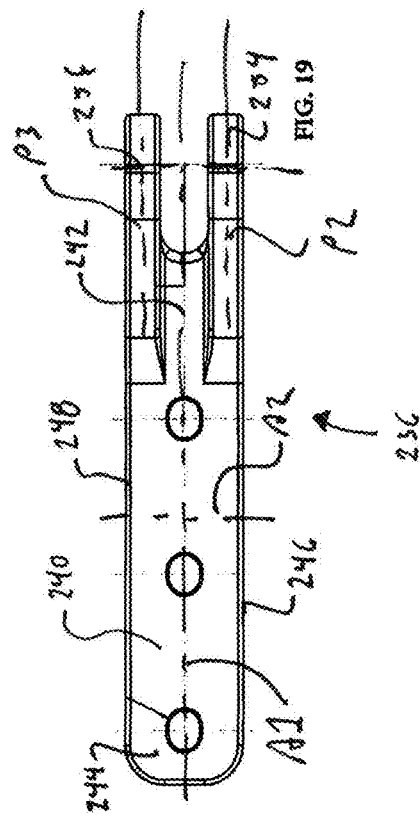

BOTTOM PLATE FOR MARINE BOOM

BACKGROUND

This relates in general to marine booms. Marine booms are often utilized to form certain types of waterway barrier. For example, some marine booms are used to form containment barriers. Some marine booms are used to form navigational barriers. Generally, these waterway barrier systems include a number of buoyant marine boom bodies that float at or about the water's surface and are connected together. These marine boom bodies are often connected together by chains, cable, wire, rope, or other devices as desired.

SUMMARY

This relates more particularly to a bottom plate for a marine boom.

In one embodiment, a waterway barrier system includes a plurality of marine booms. The marine booms include an elongated generally cylindrical shell defining a cavity. A floatation billet is disposed within the cavity. A structural member is disposed at a bottom of the shell. The marine booms may include a cap is disposed about an end of the shell.

A bottom plate is connected to the structural member. The bottom plate includes a generally planar main plate disposed about an end of the shell. A lug is attached to the main plate and extends beyond the end of the shell. The lug includes a flange defining an aperture aligned generally perpendicular with a length of the shell. Radial thickness of the flange increases toward the main plate and decreases away from the main plate.

A portion of the flange with increased radial thickness may extend above the top surface. A portion of the flange with increased radial thickness may extend below the bottom surface. Portions of the flange with increased radial thickness may extend above the top surface and below the bottom surface. One of these portions may have greater increased radial thickness than the other.

At least a portion of the lug aperture may be disposed in the plane of the main plate.

The bottom plate may include a second lug attached to the main plate, extending beyond the end of the shell, and include a flange defining an aperture aligned generally perpendicular with the length of the shell and aligned with the aperture of the first lug, where radial thickness of the flange increases toward the main plate and decreases away from the main plate.

In at least one embodiment, the bottom plate includes two similar lugs with the apertures coaxially aligned.

The bottom plate may further includes a third lug attached to the main plate extending from the main plate in a direction away from the structural member and in a plane generally perpendicular to the length of the shell and defining an aperture parallel to the length of the shell.

The first lug, second lug or third lug may be formed separately from the main plate and joined to the main plate, for example, by welding. Alternatively, any or all of the lugs may be formed integrally with the main plate, for example, by casting.

A tether connects the bottom plate of one marine boom to the bottom plate of another. The tether may include a chain and fasteners, such as bolts, disposed in links of the chain and passing through the lug apertures, and fastened in place with nuts engaging thread on an end of the bolt.

Various aspects will become apparent to those skilled in the art from the following detailed description and the accompanying drawings.

BRIEF DESCRIPTION OF THE DRAWINGS

FIG. 6 is an exploded top perspective view similar to FIG. 5 of a bottom plate with a lower lug.

FIG. 7 is a top view of the bottom plate of FIG. 5.

FIG. 8 is a side view of the bottom plate of FIG. 5.

FIG. 9 is an end view of the bottom plate of FIG. 6.

FIG. 10 is a top view of the bottom plate of FIG. 6.

FIG. 11 is a side view of the bottom plate of FIG. 6.

FIG. 12 is a top view of another embodiment of a bottom plate with a lower lug.

FIG. 13 is a side view of the bottom plate of FIG. 12.

FIG. 14 is a bottom view of the bottom plate of FIG. 12.

FIG. 15 is a bottom perspective view of the bottom plate of FIG. 12.

FIG. 16 is a top perspective view of the bottom plate of FIG. 12.

FIG. 17 is a top view similar to FIG. 12 of an embodiment of a bottom plate without a lower lug.

FIG. 18 is a side view of the bottom plate of FIG. 17.

FIG. 19 is a bottom view of the bottom plate of FIG. 17.

FIG. 20 is a bottom perspective view of the bottom plate of FIG. 17.

FIG. 21 is a top perspective view of the bottom plate of FIG. 17.

DETAILED DESCRIPTION

Figure 1:
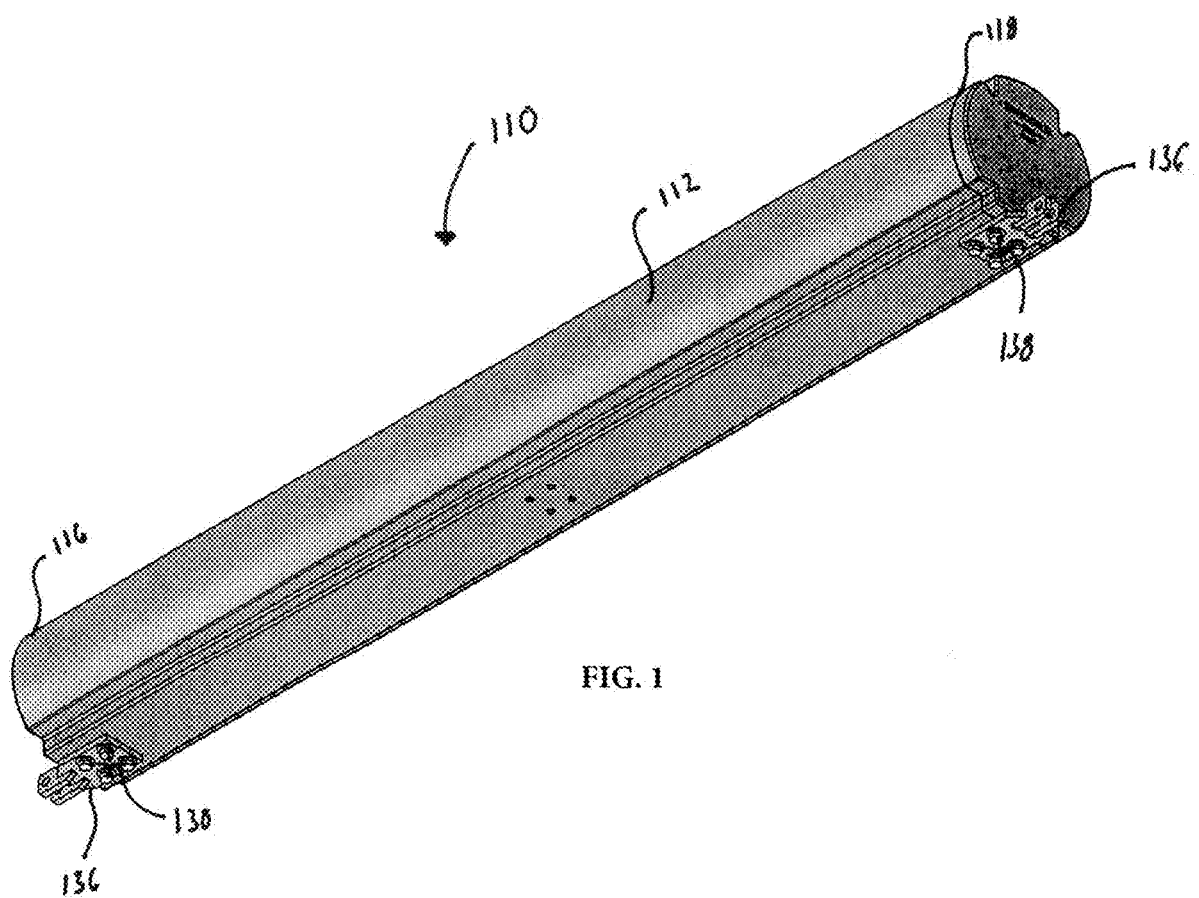
FIG. 1 is a bottom perspective view of a marine boom.
Figure 2:
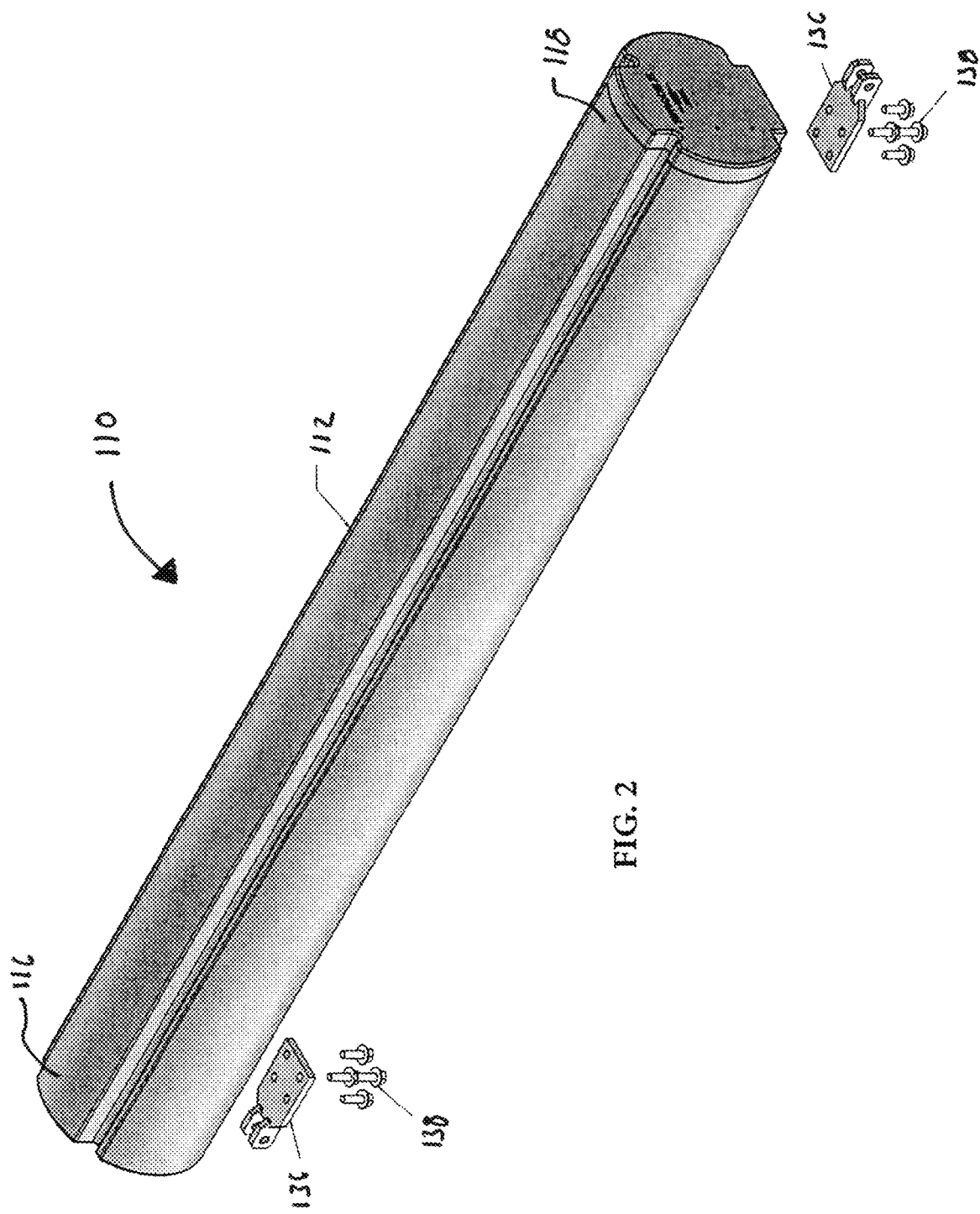
FIG. 2 is a top perspective view of the marine boom of FIG. 1, shown with the bottom plates and fasteners in an exploded fashion.
Figure 3:
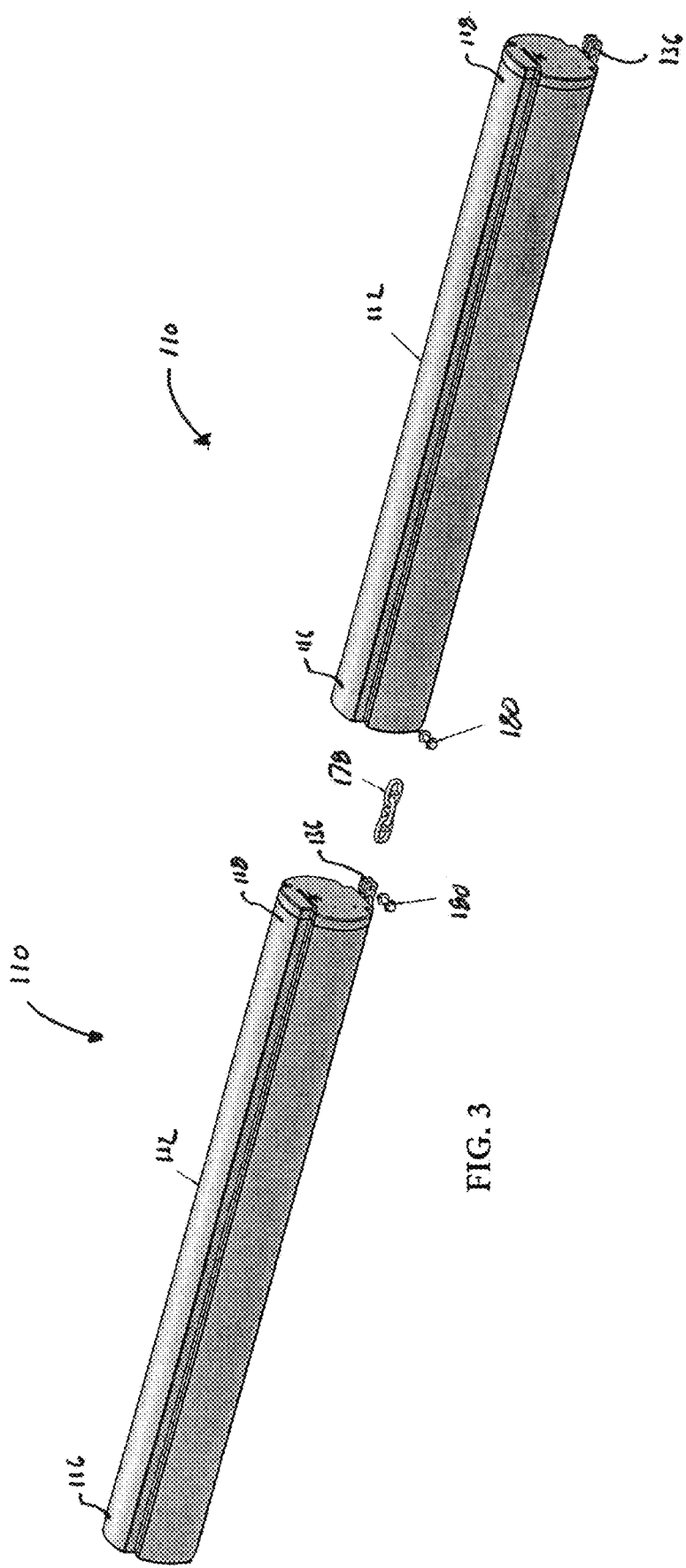
FIG. 3 is a portion of a waterway barrier system including two marine booms of FIG. 1, shown with the linkage in an exploded fashion.
Figure 4:
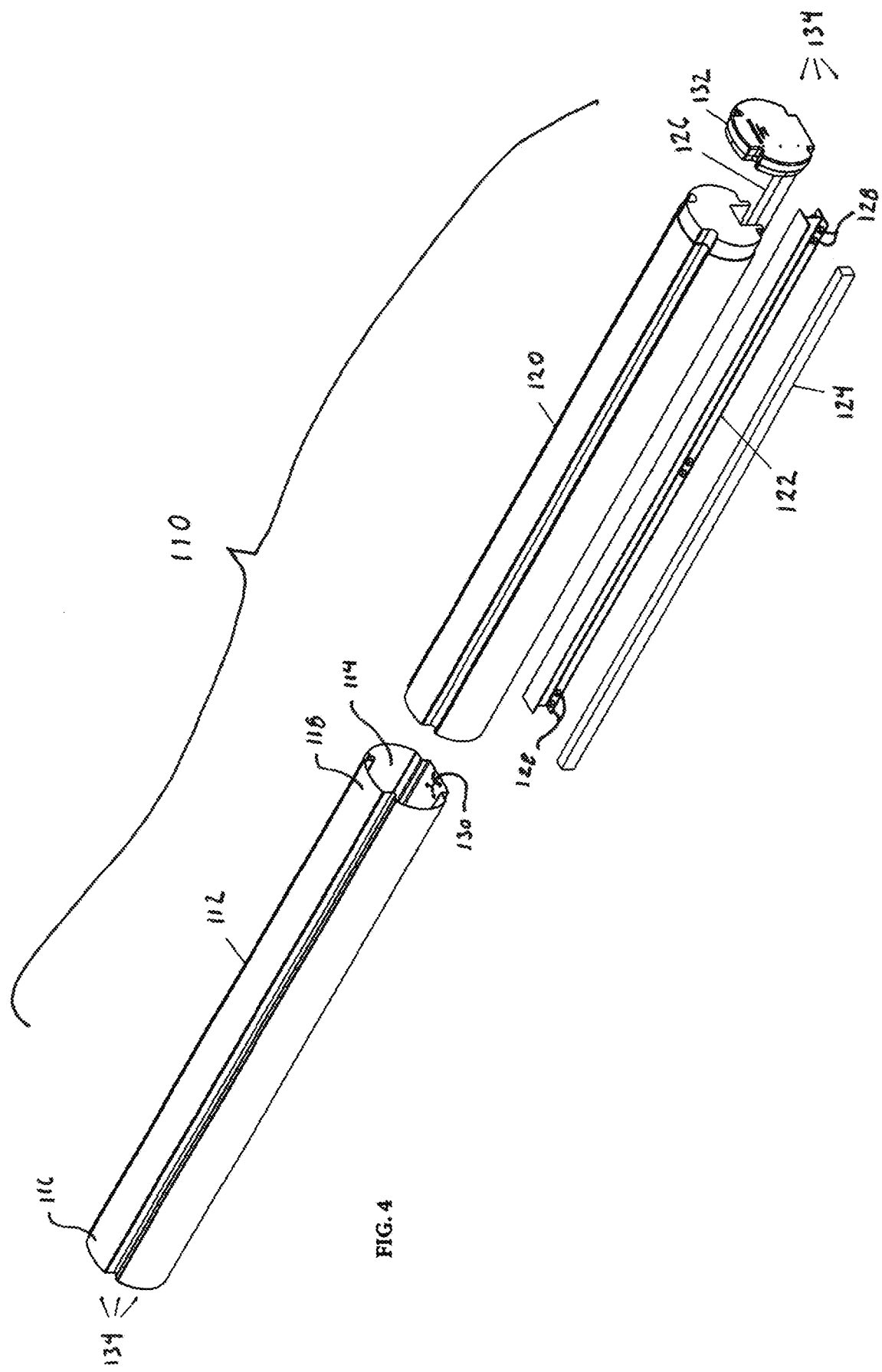
FIG. 4 is an exploded top perspective view of the main body of the marine boom of FIG. 1.

Referring now to the drawings, there is illustrated in FIGS. 1-4 a marine boom 110. The marine boom 110 includes an elongated generally cylindrical shell 112 defining a cavity 114. The shell 112 has first and second ends 116, 118.

The shell 112 maybe composed of plastic and formed through a molding process, or may be make or any other suitable material and formed in any suitable way. The shell 112 may be formed with ends 116, 118, both open, or both closed, or one open and one closed.

A floatation billet 120 is disposed within the cavity 114 and provides buoyancy for the marine boom 110 to float at or about a water's surface. The billet 120 may be formed from foam, for example, or any other material or arrangement achieving the desired buoyancy, such as a wooden billet or an air bladder.

A structural member 122 disposed at a bottom of the shell 112. The structural member 112 is illustrated as a metal I-beam, however, the structural member 122 may be made of an material in any suitable configuration to give the desired structural properties to the marine boom 110.

Optional floatation beams 124, 126 are disposed within the I-form of the structural member 122 to aid in the flotation of the marine boom 110, although such are not required. The floatation beams 124, 126 may be made of the same material as the floatation billet 120, or any other material to aid in achieving the desired buoyancy.

The structural member 112 includes optional fastening members 128, shown as threaded nuts welded to the structural member about associated apertures in the structural member; however, the fastening members may be threaded apertures formed in the structural member 112, seats for fasteners, or any other suitable fastening arrangement, as will be further discussed below. As shown, the fastening members 128 generally align with apertures 130 in the shell 112; the combination of which will be further discussed below.

As illustrated, the marine boom 110 include optional caps (one shown) 132 disposed about the ends 116, 118 of the shell 112 to close or seal open ends of the shell 112. As shown, the caps 132 are retained to the floatation billet 120 via rivets 134. However, any suitable retention mechanism may be utilized, such as other fasteners, adhesives, plastic welding, or any other suitable arrangement.

Figure 5:
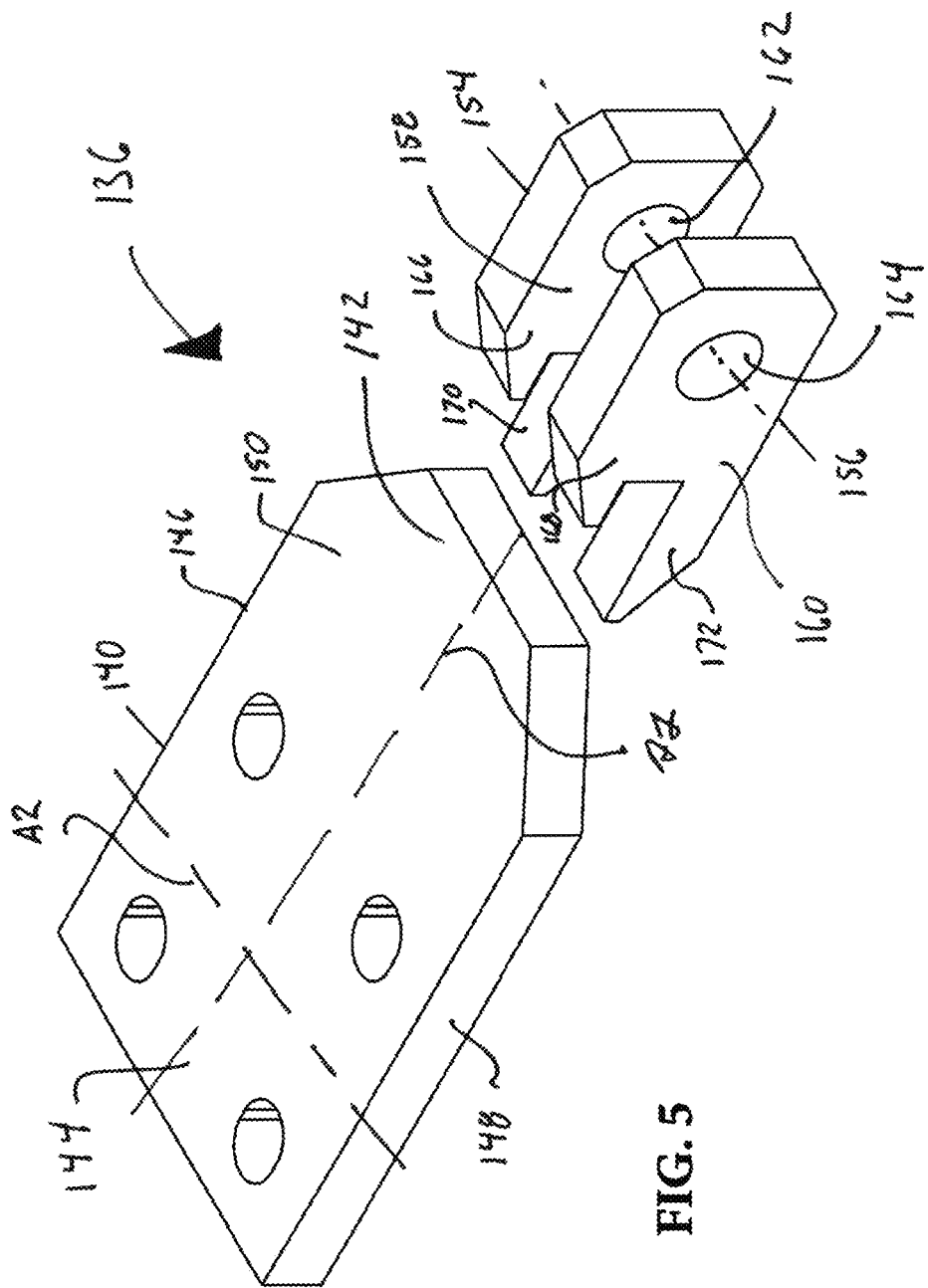
FIG. 5 is an exploded top perspective view of the bottom plate of the marine boom of FIG. 1.

Bottom plates 136, as best shown in FIG. 5, are connected to the structural member 122 by fasteners 138, as will be further discussed below. The fasteners 138 are shown as bolts with washers, such as flat washers and/or lock washer, although such is not required. The bottom plates 136 may be joined to the marine booms 110 by any suitable mechanism or arrangement as will be further described below.

The bottom plate 136 includes a generally planar main plate 140. The main plate 140 is joined to the marine boom 110 about one of the first or second ends 116, 118 of the shell 112.

The main plate 140 has first and second ends 142, 144 with first and second sides 146, 148 extending there between. The main plate 140 extends in a first plane P1, the first plane being defined by a longitudinal axis A1 extending between the first and second ends 142, 144 and a lateral axis A2 normal to the longitudinal axis and extending between the first and second sides 146, 148, with top and bottom surfaces 150, 152 bounded by the first and second ends 142, 144 and the first and second sides 146, 148 and extending parallel to the first plane P1.

Two lugs 154, 156 are attached to the main plate 140. It must be understood that that the bottom plate 136 may include any number of lugs as desired. The lugs 154, 156 extends in second and third planes P2 and P3 which are generally perpendicular to the first plane P1 and parallel to one another. The lugs 154, 156 include flanges 158, 160 defining apertures 162, 164 and are aligned generally parallel with the lateral axis A2 and coaxially, where radial thickness of the flange increases toward the main plate and decreases away from the main plate.

In the illustrated embodiments, least a portion of the apertures 162, 164 are disposed in the first plane P1 and in some embodiments the center of the apertures 162, 162 lie in the plane P1, although neither are required.

In the illustrated embodiments, first portions 166, 168 of the flanges 158, 160 with increased radial thickness extends above the top surface 150 and second portions 170, 172 of flange with increased radial thickness extends below the bottom surface 152. As shown, the second portions 170, 172 have greater increased radial thickness than the first portions 166, 168. Although, the first portions 166, 168 may have greater increased radial thickness than the second portions 170, 172. Further, the first portions 166, 168 and the second portions 170, 172 may the same increased radial thickness.

As shown in FIG. 6, the bottom plate 136 may further include a bottom lug 174 attached to the main plate 140 which extending from the bottom surface 152 in fourth plane P4 parallel with the lateral axis A2 and perpendicular to the longitudinal axis A1 and defining an aperture 176 aligned parallel to the longitudinal axis A1.

It must be understood that the main plate 140 and the lugs 154, 156, 174 may be formed integrally, e.g. cast, printed, molded, or other form of manufacture, or may be formed separately and joined together, e.g. mechanical fastening, welding, bonding, or other joining process.

As shown the first and second lugs 154, 156 are attached to the main plate 150 and extend beyond the respective one of the first or second end 116, 118.

Referring again to FIG. 3. a tether 178 connects bottom plates 136 of two marine booms 110. The tether may include a chain, or wire, or rope, or other connecting member. The tether 178 includes fasteners 180, such as bolts including heads, disposed in links of the chain and passing through the lug apertures, and fastened in place with nuts engaging thread on an end of the bolt. It may be arranged such that a link of the chain may be disposed between the two lugs 154, 156.

There is further illustrated in FIGS. 12-16 and FIGS. 17-21 two additional embodiments of bottom plates 236 with the former including a bottom lug 274 and the later not. Similar elements in these embodiments have been labeled with similar numerical identifiers as the previous description, but increased by "100".

While principles and modes of operation have been explained and illustrated with regard to particular embodiments, it must be understood, however, that this may be practiced otherwise than as specifically explained and illustrated without departing from its spirit or scope.

What is claimed is:

1. A marine boom comprises:
   an elongated generally cylindrical shell defining a cavity, the shell having first and second ends;
   a floatation billet disposed within the cavity;
   a structural member disposed at a bottom of the shell; and
   a bottom plate connected to the structural member, the bottom plate including:
   a generally planar main plate disposed about one of the first or second ends of the shell; and
   at least one lug attached to the main plate, extending beyond the one of the first or second end, and including a flange defining an aperture aligned generally perpendicular with a length of the shell, where radial thickness of the flange increases toward the main plate and decreases away from the main plate,
   where a cap is disposed about the one of the first or second ends and where the at least one lug extends beyond the cap.

2. The marine boom of claim 1 where the bottom plate further includes a second lug attached to the main plate, extending beyond the one of the first or second end, and including a flange defining an aperture aligned generally perpendicular with the length of the shell and aligned with the aperture of the first lug, where radial thickness of the flange increases toward the main plate and decreases away from the main plate.

3. The marine boom of claim 2 where the bottom plate further includes a third lug attached to the main plate extending from the main plate in a direction away from structural member and in a plane generally perpendicular to the length of the shell and defining an aperture parallel to the length of the shell.

4. The marine boom of claim 3 where the first lug, second lug and third lug are joined to the main plate by welding.

5. A bottom plate for a marine boom comprising:
a main plate, extending in a first plane, having first and second ends with first and second sides extending there between, the first plane being defined by a longitudinal axis extending between the first and second ends and a lateral axis normal to the longitudinal axis and extending between the first and second sides, with top and bottom surfaces bounded by the first and second ends and the first and second sides and extending parallel to the first plane;
at least one lug attached to the main plate, extending in a second plane generally perpendicular to the first plane, including a flange defining an aperture aligned generally parallel with the lateral axis, where radial thickness of the flange increases toward the main plate and decreases away from the main plate,
where a portion of flange with increased radial thickness extends below the bottom surface.

6. The bottom plate of claim 5 where at least a portion of the aperture is disposed in the first plane.

7. The bottom plate claim 5 where the portion of flange with increased radial thickness extending below the bottom surface is a first portion of flange with increased radial thickness and where a second portion of flange with increased radial thickness extends above the top surface.

8. The bottom plate of claim 7 where one of the first portion and the second portion have greater increased radial thickness than the other.

9. The bottom plate of claim 8 where the second portion has a greater increased radial thickness than the first portion.

10. The bottom plate of claim 5 further comprising a second lug attached to the main plate, extending in a third plane generally perpendicular to the first plane and parallel to the second plane, including a flange defining an aperture aligned generally parallel with the lateral axis and coaxially with the aperture of the first lug, where radial thickness of the flange increases toward the main plate and decreases away from the main plate.

11. The bottom plate of claim 10 further comprising a third lug attached to the main plate extending from the bottom surface in a plane parallel with the lateral axis and perpendicular to the longitudinal axis and defining an aperture parallel to the longitudinal axis.

12. The bottom plate of claim 5 where the main plate and the lug are formed integrally.

13. The bottom plate of claim 5 where the main plate and the lug are joined with welding.

14. A waterway barrier system comprising
a first and second marine booms each including:
an elongated generally cylindrical shell defining a cavity, the shell having first and second ends;
a floatation billet disposed within the cavity;
a structural member disposed at a bottom of the shell; and
a bottom plate connected to the structural member, the bottom plate including:
a generally planar main plate disposed about one of the first or second ends of the shell; and
at least one lug attached to the main plate, extending beyond the one of the first or second end, and including a flange defining an aperture aligned generally perpendicular with a length of the shell, where radial thickness of the flange increases toward the main plate and decreases away from the main plate; and
a tether connecting the bottom plate of the first marine boom to the bottom plate of the second marine boom, where the tether includes a chain.

15. The waterway barrier system of claim 14 further comprising first and second fasteners each disposed within a respective lug aperture and a respective link of the chain.

16. The waterway barrier system of claim 15 where each bottom plate further includes a second lug attached to the main plate, extending beyond the one of the first or second end, and including a flange defining an aperture aligned generally perpendicular with a length of the shell and coaxial with the aperture of the first lug of the same bottom plate, where radial thickness of the flange increases toward the main plate and decreases away from the main plate; and where the respective fastener is further disposed within the aperture of the second lug and the respective chain link is disposed between the respective first and second lugs.

17. The waterway barrier system of claim 16 where each first and second fastener includes a bolt with a head disposed on one end and threads disposed on an another end with a nut disposed about the other end of the bolt and engaging the threads.

\* \* \* \* \*